Jan. 17, 1933.  E. W. GRUDNICKI  1,894,862
CLEAR VISION ATTACHMENT FOR MOTOR VEHICLES
Filed July 30, 1931
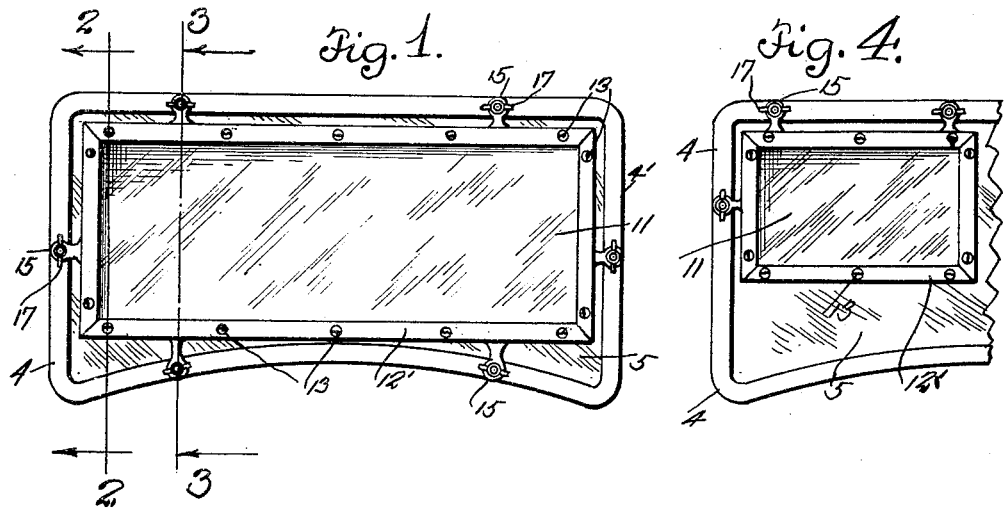
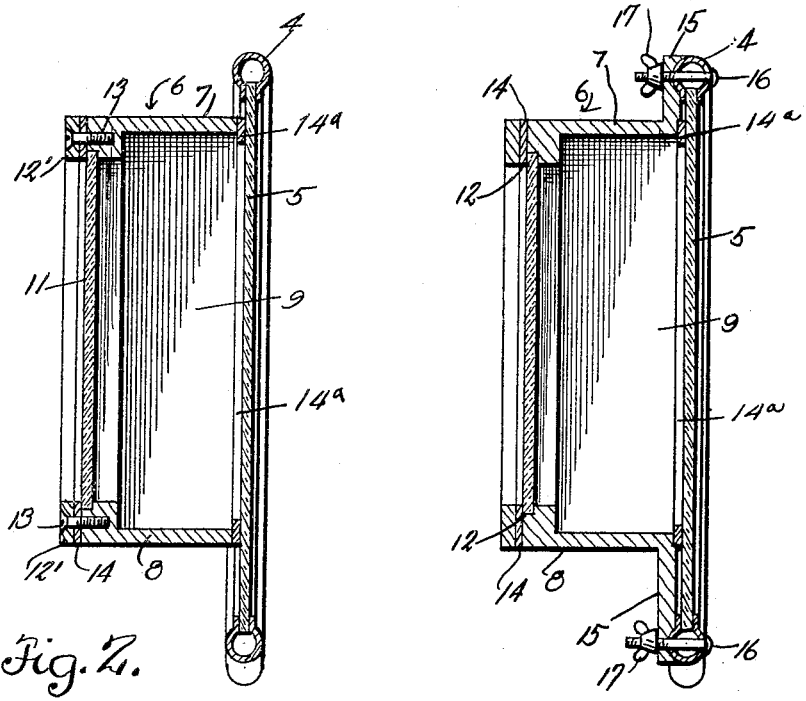
Inventor
Emilia W. Grudnicki
By Bryant & Lowry
Attorneys Patented Jan. 17, 1933

1,894,862

UNITED STATES PATENT OFFICE

EMILIA W. GRUDNICKI, OF ASHLEY, PENNSYLVANIA

CLEAR VISION ATTACHMENT FOR MOTOR VEHICLES

Application filed July 30, 1931. Serial No. 554,138.

This invention has relation to devices for preventing the dimming of the windshield of motor vehicles by the accumulation on the glass of condensed watery vapor, and consists of an air tight casing adapted to be secured to the framing of the windshield, and having a glass front whereby the shield itself will be protected from the deposit thereon of moisture or frost and whereby obscuration of vision through the glass front will be prevented by the higher temperature of the air behind the same, than the air outside the same.

In the accompanying drawing, illustrating a preferred embodiment of the invention, Figure 1 is a front elevation of the device applied to a windshield;

Figure 2 is a sectional view on the line 2—2 of Figure 1;

Figure 3 is a sectional view on the line 3—3 of Figure 1; and

Figure 4 is a front elevation of a modified construction.

In the drawing, the numeral 4 designates the usual framing of a windshield with the glass window or plate 5.

The numeral 6 designates a hollow boxlike structure having horizontal top and bottom walls 7 and 8 respectively and the end walls 9.

The back portion of the casing is open, while the front portion is provided with and closed by a glass pane or panel 11, which is secured in a rabbet 12 of the box 6, by means of a rectangular frame 12' attached by screws 13, the joint or seam between the edges of the glass 11 being rendered air and water tight by a rubber gasket 14. A similar gasket 14ª for a like purpose is fitted to the inner edges of the walls of the box, and when the latter is in use rests against the windshield.

To secure the device in position in front of and against the windshield, the box 6 is provided around its edges at intervals, with bored ears 15, through which short headed bolts 16 are passed from the windshield frame and are secured by winged nuts 17.

The device may be of any suitable size, so as to cover substantially the whole of the windshield, as shown in Figure 1, or only a limited area as shown in Figure 2. It has been found in practice that the best results with the use of the device are obtained when the glass panel 11 is spaced at least two inches from the glass plate 5 of the windshield, although the distance between the two glasses may be slightly increased.

The uses and advantages of the device will be readily understood.

The windshield itself is protected against the dimming effect of moisture or frost by the shielding effect of the air chamber in front, while the same effect on the front glass of the box will be prevented by the protection of the back surface thereof against the chilling effect of the outside air and by the higher temperature in cold weather of the confined air in the sealed air chamber.

It is to be understood that the form of the invention herewith shown and described is to be taken as a preferred example of the same and that various changes in the shape, size, and arrangement of parts may be resorted to without departing from the spirit of the invention or the scope of the subjoined claim.

I claim:—

A clear vision attachment for motor vehicle windshields comprising a box-like casing having a glass panel in one side and the other side open, means for holding the open side in engagement with the glass of the windshield consisting of apertured lateral ears carried by the casing and extending over the frame of the windshield and screw bolts passed through the ears and frame of the windshield for securing the casing to the windshield, a gasket interposed between the open side of the casing and the glass of the windshield inwardly of the lateral apertured ears, a rabbetted edge on the casing in which the glass panel is placed, a rubber gasket overlying the edges of the panel and casing and a retaining frame for the panel secured to the casing and engaged with the gasket.

In testimony whereof I affix my signature.

EMILIA W. GRUDNICKI.